(12) United States Patent
Spitzer

(10) Patent No.: US 11,817,597 B2
(45) Date of Patent: *Nov. 14, 2023

(54) LIGHTWEIGHT STRUCTURAL VENTED BATTERY SYSTEM FOR ELECTRIC AND HYBRID ELECTRIC VEHICLES

(71) Applicant: Ampaire, Inc., Hawthorne, CA (US)

(72) Inventor: Jeffrey Spitzer, San Diego, CA (US)

(73) Assignee: Ampaire, Inc., Hawthorne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,058

(22) Filed: Dec. 10, 2021

(65) Prior Publication Data

US 2023/0187765 A1   Jun. 15, 2023

(51) Int. Cl.
| | |
|---|---|
| *B60L 50/15* | (2019.01) |
| *B60L 50/00* | (2019.01) |
| *H01M 50/30* | (2021.01) |
| *H01M 10/613* | (2014.01) |
| *B60R 16/033* | (2006.01) |
| *H01M 50/213* | (2021.01) |

(52) U.S. Cl.
CPC ........... *H01M 50/30* (2021.01); *B60R 16/033* (2013.01); *H01M 10/613* (2015.04); *H01M 50/213* (2021.01); *H01M 2220/20* (2013.01)

(58) Field of Classification Search
CPC .. H01M 50/30; H01M 10/613; H01M 50/213; H01M 2220/20; B60R 16/033
See application file for complete search history.

(56) References Cited

U.S. PATENT DOCUMENTS

| | | | |
|---|---|---|---|
| 2013/0071706 A1* | 3/2013 | Lee ..................... | H01M 10/486 429/62 |
| 2016/0197384 A1* | 7/2016 | DeKeuster ........ | H01M 10/6551 429/120 |
| 2021/0221526 A1* | 7/2021 | Van Bavel ............. | B64D 27/02 |

OTHER PUBLICATIONS

International Search Report and Written Opinion for Application No. PCT/US2022/052446, dated Feb. 7, 2023, 7 pages.

* cited by examiner

*Primary Examiner* — Elim Ortiz

(57) ABSTRACT

In general, one aspect disclosed features a battery system for a vehicle, the battery system comprising: multiple battery modules, wherein each battery module comprises one or more battery cells, and wherein each battery module comprises an exhaust port; and one or more structural members mechanically coupled to the multiple battery modules; wherein the one or more structural members and the multiple battery modules define an exhaust chamber; wherein the exhaust chamber is in fluid communication with the exhaust ports of the multiple battery modules; wherein the one or more structural members comprise an outlet port in fluid communication with the exhaust chamber and an exterior of the exhaust chamber.

12 Claims, 15 Drawing Sheets

LIGHTWEIGHT STRUCTURAL VENTED BATTERY SYSTEM FOR ELECTRIC AND HYBRID ELECTRIC VEHICLES

DESCRIPTION OF RELATED ART

The disclosed technology relates generally to electric battery systems for electric and hybrid electric vehicles.

SUMMARY

In general, one aspect disclosed features a battery system for a vehicle, the battery system comprising: multiple battery modules, wherein each battery module comprises one or more battery cells, and wherein each battery module comprises an exhaust port; and one or more structural members mechanically coupled to the multiple battery modules; wherein the one or more structural members and the multiple battery modules define an exhaust chamber; wherein the exhaust chamber is in fluid communication with the exhaust ports of the multiple battery modules; wherein the one or more structural members comprise an outlet port in fluid communication with the exhaust chamber and an exterior of the exhaust chamber.

Embodiments of the battery system may include one or more of the following features. Some embodiments comprise an exhaust pipe in fluid communication with the outlet port of the exhaust chamber. Some embodiments comprise a fairing comprising an exhaust port; wherein the multiple battery modules and the one or more structural members are disposed within the fairing, and wherein the exhaust pipe is in fluid communication with the exhaust port of the fairing. In some embodiments, at least one of the battery modules comprises: a heat sink. Some embodiments comprise at least one upper row of the battery modules, wherein each of the battery modules has a top and a bottom, wherein the exhaust ports are formed in the bottoms of the battery modules, and wherein the tops of the battery modules in the at least one upper row face upward; at least one lower row of the battery modules, wherein the at least one lower row of the battery modules is below the at least one upper row of the battery modules, and wherein the tops of the battery modules in the at least one lower row face downward; wherein the one or more structural members comprise at least one first structural member mechanically coupled to at least one battery module in the at least one upper row and at least one battery module in the at least one lower row; wherein the at least one first structural member, the at least one battery module in the at least one upper row, and the at least one battery module in the at least one lower row define at least a portion of the exhaust chamber. In some embodiments, the at least one upper row of the battery modules comprises at least two upper rows of the battery modules; the at least one lower row of the battery modules comprises at least two lower rows of the battery modules; the one or more structural members comprise at least one second structural member mechanically coupled to the tops of battery modules in at least two of the upper rows; and the at least one second structural member defines at least a portion of the exhaust chamber. In some embodiments, the one or more structural members comprise at least one third structural member mechanically coupled to the tops of battery modules in at least two of the lower rows; and the at least one third structural member defines at least a portion of the exhaust chamber.

In general, one aspect disclosed features an electric power train comprising: a battery system; and an electric motor powered by the battery system; wherein the battery system comprises: multiple battery modules, wherein each battery module comprises one or more battery cells, and wherein each battery module comprises an exhaust port; and one or more structural members mechanically coupled to the multiple battery modules; wherein the one or more structural members and the multiple battery modules define an exhaust chamber; wherein the exhaust chamber is in fluid communication with the exhaust ports of the multiple battery modules; wherein the one or more structural members comprise an outlet port in fluid communication with the exhaust chamber and an exterior of the exhaust chamber.

Embodiments of the electric power train may include one or more of the following features. In some embodiments, the battery system further comprises: an exhaust pipe in fluid communication with the outlet port of the exhaust chamber. In some embodiments, the battery system further comprises: a fairing comprising an exhaust port; wherein the multiple battery modules and the one or more structural members are disposed within the fairing, and wherein the exhaust pipe is in fluid communication with the exhaust port of the fairing. In some embodiments, at least one of the battery modules comprises: a heat sink. In some embodiments, the battery system further comprises: at least one upper row of the battery modules, wherein each of the battery modules has a top and a bottom, wherein the exhaust ports are formed in the bottoms of the battery modules, and wherein the tops of the battery modules in the at least one upper row face upward; at least one lower row of the battery modules, wherein the at least one lower row of the battery modules is below the at least one upper row of the battery modules, and wherein the tops of the battery modules in the at least one lower row face downward; wherein the one or more structural members comprise at least one first structural member mechanically coupled to at least one battery module in the at least one upper row and at least one battery module in the at least one lower row; wherein the at least one first structural member, the at least one battery module in the at least one upper row, and the at least one battery module in the at least one lower row define at least a portion of the exhaust chamber. In some embodiments, the at least one upper row of the battery modules comprises at least two upper rows of the battery modules; the at least one lower row of the battery modules comprises at least two lower rows of the battery modules; the one or more structural members comprise at least one second structural member mechanically coupled to the tops of battery modules in at least two of the upper rows; and the at least one second structural member defines at least a portion of the exhaust chamber. In some embodiments, the one or more structural members comprise at least one third structural member mechanically coupled to the tops of battery modules in at least two of the lower rows; and the at least one third structural member defines at least a portion of the exhaust chamber.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Electric and hybrid electric aircraft employ electric power to drive the propulsion system. These aircraft have several significant advantages over typical combustion-powered aircraft. For example, the emissions (especially on takeoff) and noise pollution of these electric aircraft are significantly reduced compared to a combustion-powered aircraft. An essential component of these aircraft is a high power battery system.

When integrating high power batteries (such as lithium ion or lithium based batteries) into electric or hybrid electric aircraft or other vehicles, there is a risk that one or more cells within the battery may enter a thermal runaway condition where hot, caustic, flammable gasses (and possibly flames) are ejected rapidly from the cell. Because this condition cannot be absolutely prevented, the aircraft battery design must assume that the thermal runaway condition will exist, and so must provide a suitable method to capture and vent the ejecta overboard.

Other design considerations exist. Depending on the arrangement of the cells within the battery, the vent structure may be large, heavy, and/or expensive to fabricate. High power batteries also require a large number of cells to be structurally arranged over a wide area.

Embodiments of the disclosure provide a large, lightweight vented battery system for aircraft propulsion with sufficient structure to withstand all the inertial loads imparted by the aircraft motions, and with a venting mechanism to carry high temperature gasses overboard in the event of a battery thermal runaway. While embodiments of the battery system are described with respect to aircraft, the disclosed embodiments also may be used in any other vehicles. For example, the disclosed embodiments also may be used in land and water vehicles.

Some embodiments provide a lightweight battery system that may include multiple battery modules and one or more structural members mechanically coupled to the multiple battery modules. Together the one or more structural members and the multiple battery modules may define an exhaust chamber. Each battery module may include one or more battery cells. Each Battery module may include an exhaust port. The exhaust chamber may be in fluid communication with the exhaust ports of the multiple battery modules. The one or more structural members may include an outlet port in fluid communication with an exterior of the exhaust chamber. The system may include an exhaust pipe in fluid communication with the outlet port of the exhaust chamber. These and other features are described in detail below.

As used herein, the phrase "in fluid communication" is intended to have its common meaning in engineering practice. For example, fluids may pass between two chambers described as being in fluid communications. The fluids may be any fluids, including gases.

Figure 1:
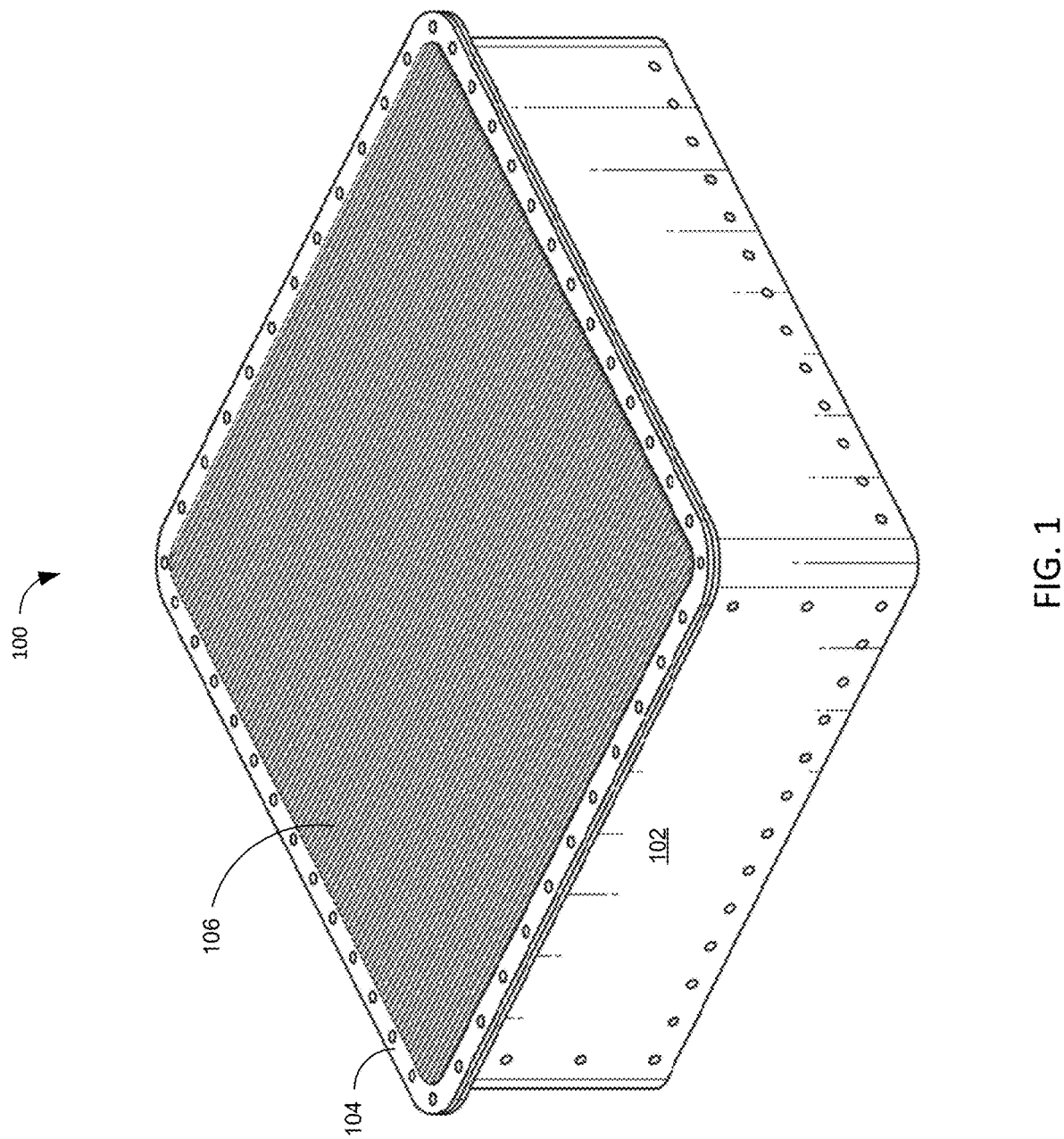
FIG. 1 illustrates a battery module according to some embodiments of the disclosed technologies.

FIG. 1 illustrates a battery module 100 according to some embodiments of the disclosed technologies. The battery module 100 may be rectangular in shape, as shown in FIG. 1. However, other shapes may be used instead. The battery module 100 may include a wall 102 and a lid 104. The wall 102 may include a flange that mates with the lid 104. The flange of the wall 102 and the lid 104 may have matching holes formed therethrough for attachment to each other using fasteners. The fasteners may include rivets, screws, nuts and bolts, and similar fasteners. In other embodiments, other methods of attachment may be used.

The battery module 100 may include a heat sink 106. For example, a heat sink 106 may be attached to the lid 104 of the battery module 100, as shown in FIG. 1. The wall 102, lid 104, and heat sink 106 may be fabricated from any suitable material. The material may be metal. The metal may be stainless steel or aluminum.

The battery module 100 may contain a number of battery cells 204. The battery cells may be implemented in any suitable manner. The battery cells may be lithium ion or lithium based. The battery module 100 may include other features as well. These features may include electrical harnesses, connectors, and the like. These features may include cooling manifolds, ducts, and the like.

Figure 2B:
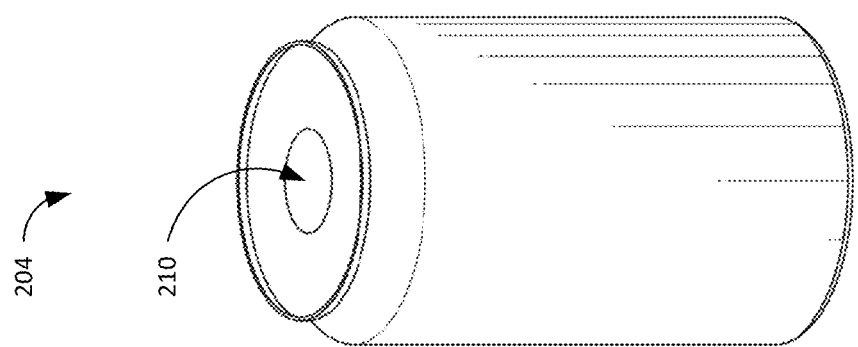
FIG. 2B illustrates the battery cell of FIG. 2B according to some embodiments of the disclosed technologies.
Figure 2A:
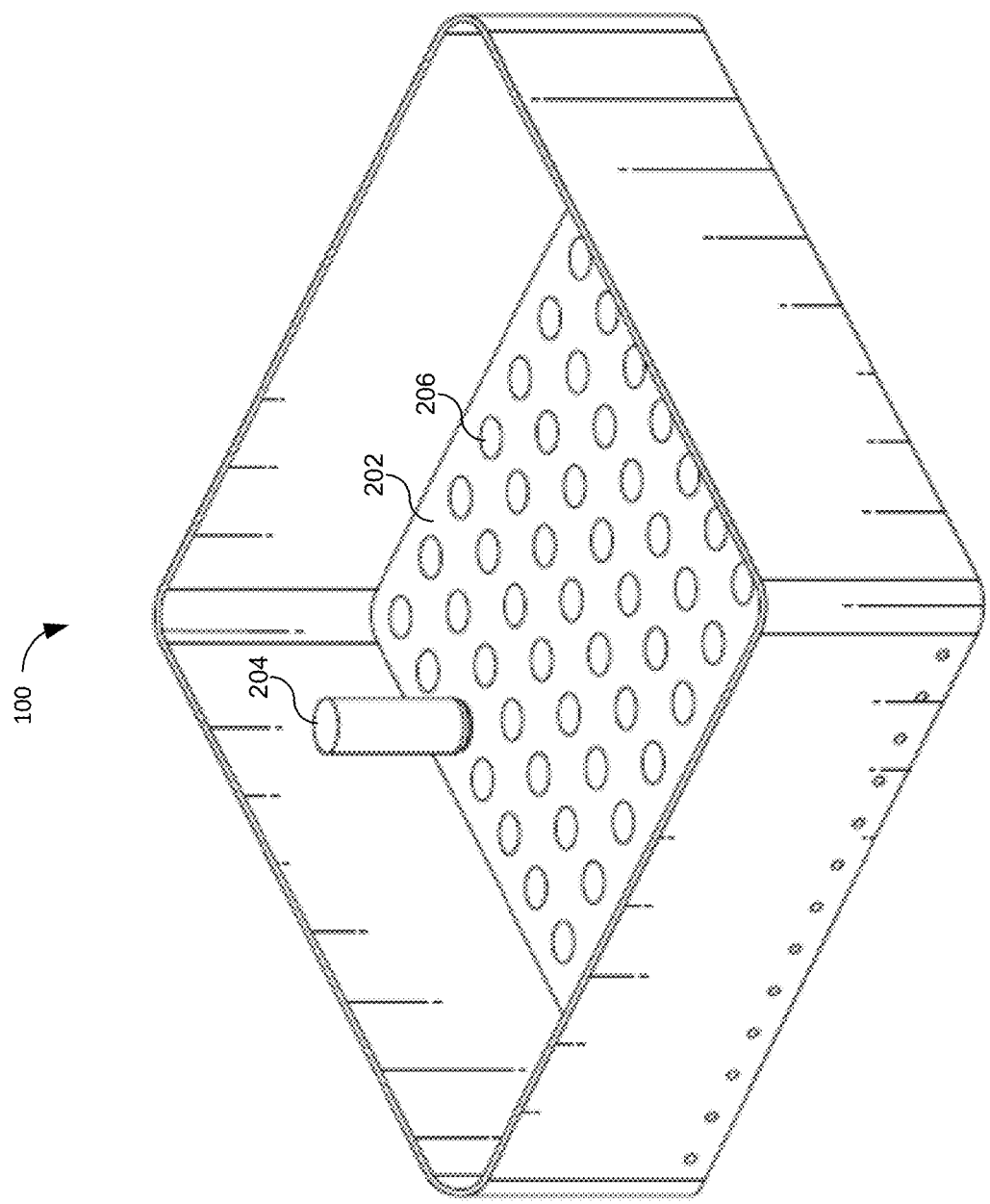
FIG. 2A illustrates the battery module of FIG. 1 with the lid removed showing a battery cell mounting plate with a battery cell mounted thereon according to some embodiments of the disclosed technologies.

FIG. 2A illustrates the battery module 100 of FIG. 1 with the lid 104 removed showing a battery cell mounting plate 202 with a battery cell 204 mounted thereon according to some embodiments of the disclosed technologies. FIG. 2B illustrates the battery cell 204 of FIG. 2B according to some embodiments of the disclosed technologies. Referring to FIG. 2A, the battery module 100 comprises the battery cell mounting plate 202, which may be disposed at the bottom of the battery module 100, as shown in FIG. 2A. The battery cell mounting plate 202 may include multiple battery mounts 206, each for receiving a respective battery cell 204. Each battery mount 206 may include a retaining mechanism such as a retaining clip (not shown) for securing the battery cell 204 in the battery mount 206.

Figure 10:
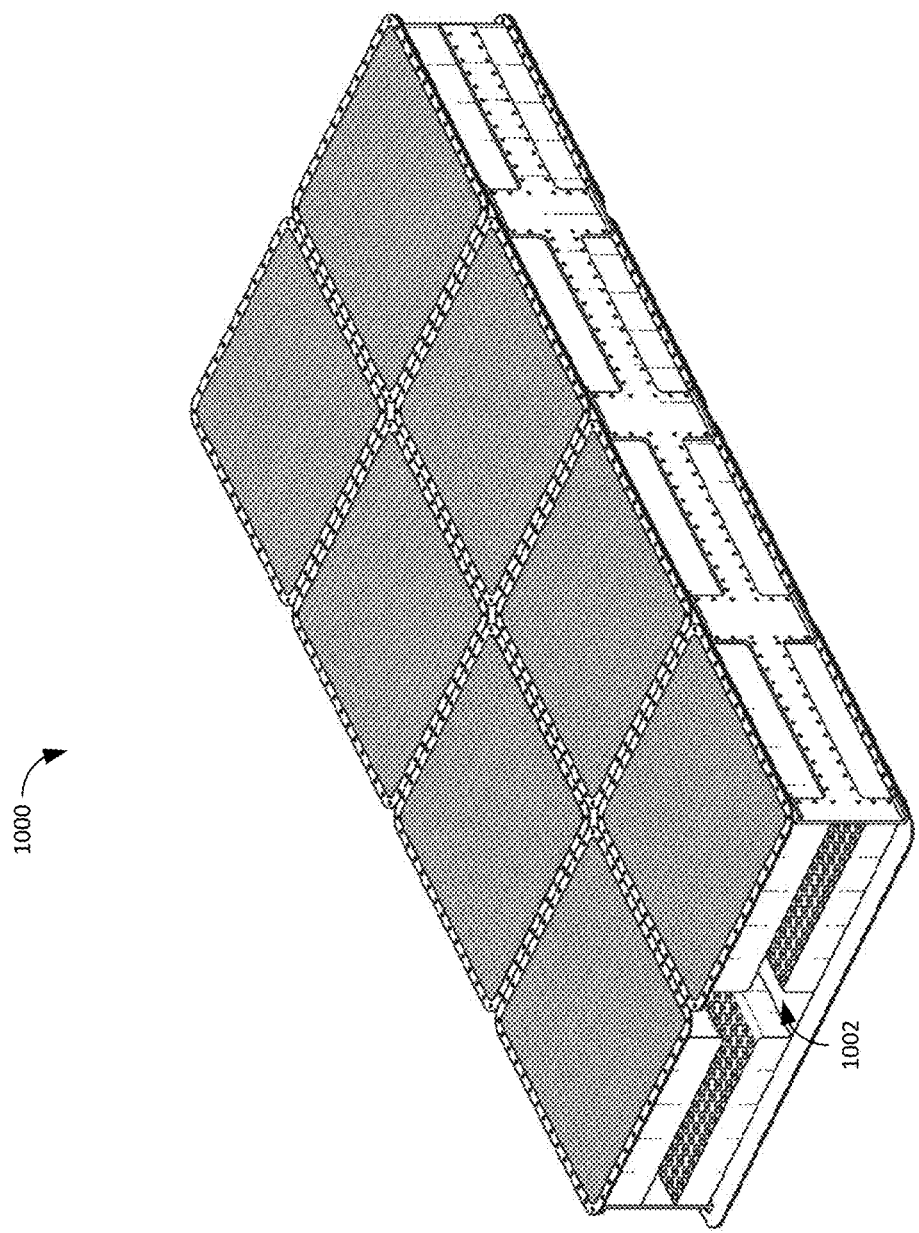
FIG. 10 illustrates a lightweight structural vented battery system with one end plate removed according to some embodiments of the disclosed technologies.

Referring to FIG. 2B, each battery cell 204 may include an exhaust port 210 for venting exhaust from the battery cell 204. Each battery cell 204 may be mounted inverted such that the exhaust port 210 of the battery cell is in fluid communication with the exhaust chamber 1002 (FIG. 10).

Figure 3:
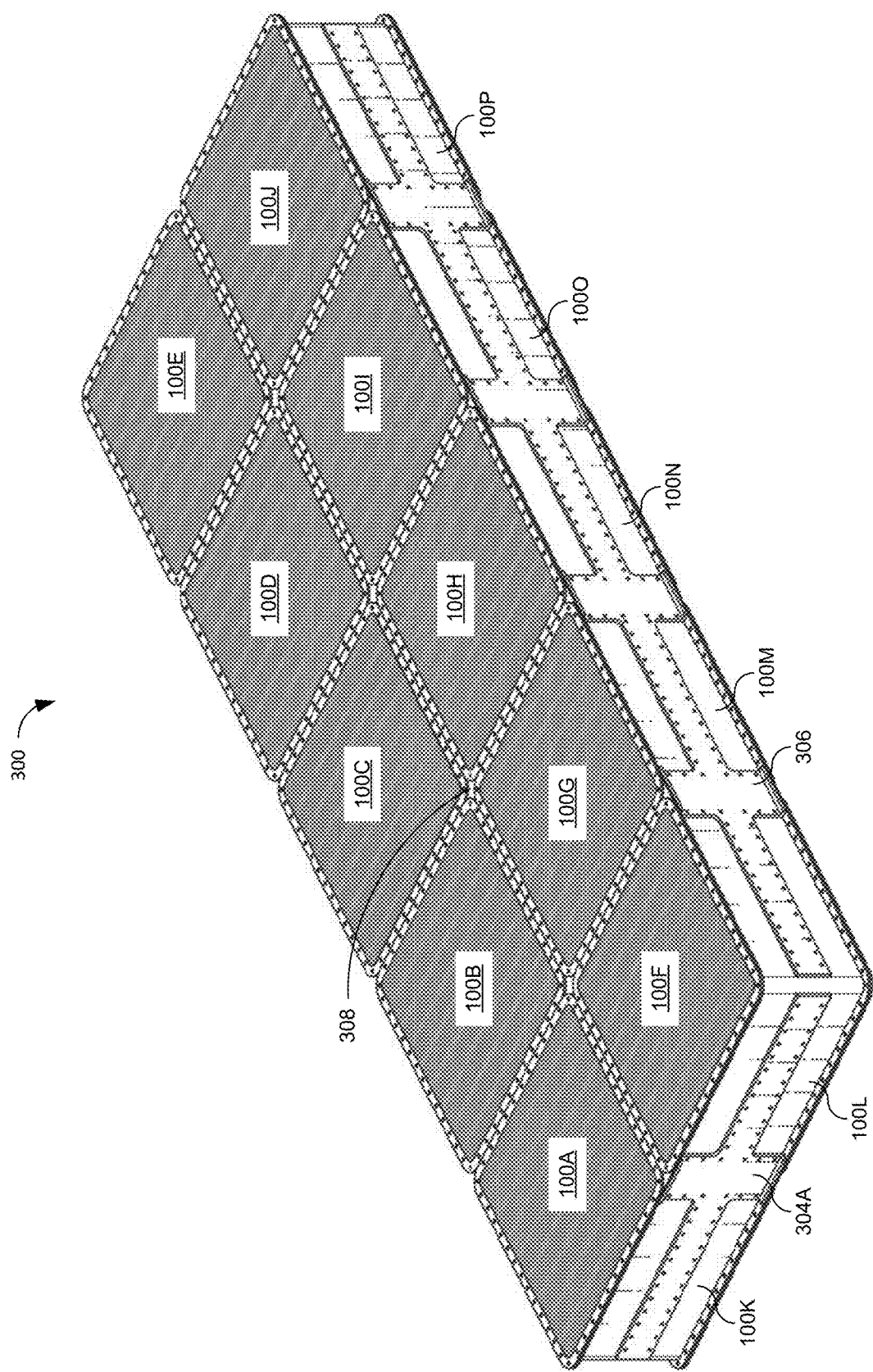
FIG. 3 illustrates a lightweight structural vented battery system according to some embodiments of the disclosed technologies.

FIG. 3 illustrates a lightweight structural vented battery system 300 according to some embodiments of the disclosed technologies. The system 300 may include multiple battery modules 100. The battery modules 100 may be implemented as described with reference to FIGS. 1 and/or 2.

In the example of FIG. 3, the system 300 may include 20 battery modules 100. Referring to FIG. 3, 10 of the battery modules 100A-J face upward, and the remaining 10 battery modules face downward, including battery modules 100K-P. In other embodiments, other quantities of battery modules 100 may be used.

The system 300 may include one or more structural members mechanically coupled to the multiple battery modules 100. The structural members may include holes formed therethrough for attachment to the battery modules 100 using fasteners. In other embodiments, other methods of attachment may be used. In the example of FIG. 3, the structural members may include two end plates 304, two side plates 306, and top and bottom plates 308. The structural members may be fabricated from any suitable material. The material may be metal. The metal may be stainless steel or aluminum.

The one or more structural members and the multiple battery modules may define an exhaust chamber. The exhaust chamber may be in fluid communication with the exhaust ports of the multiple battery modules, for example as shown in FIG. 10.

Figure 4:
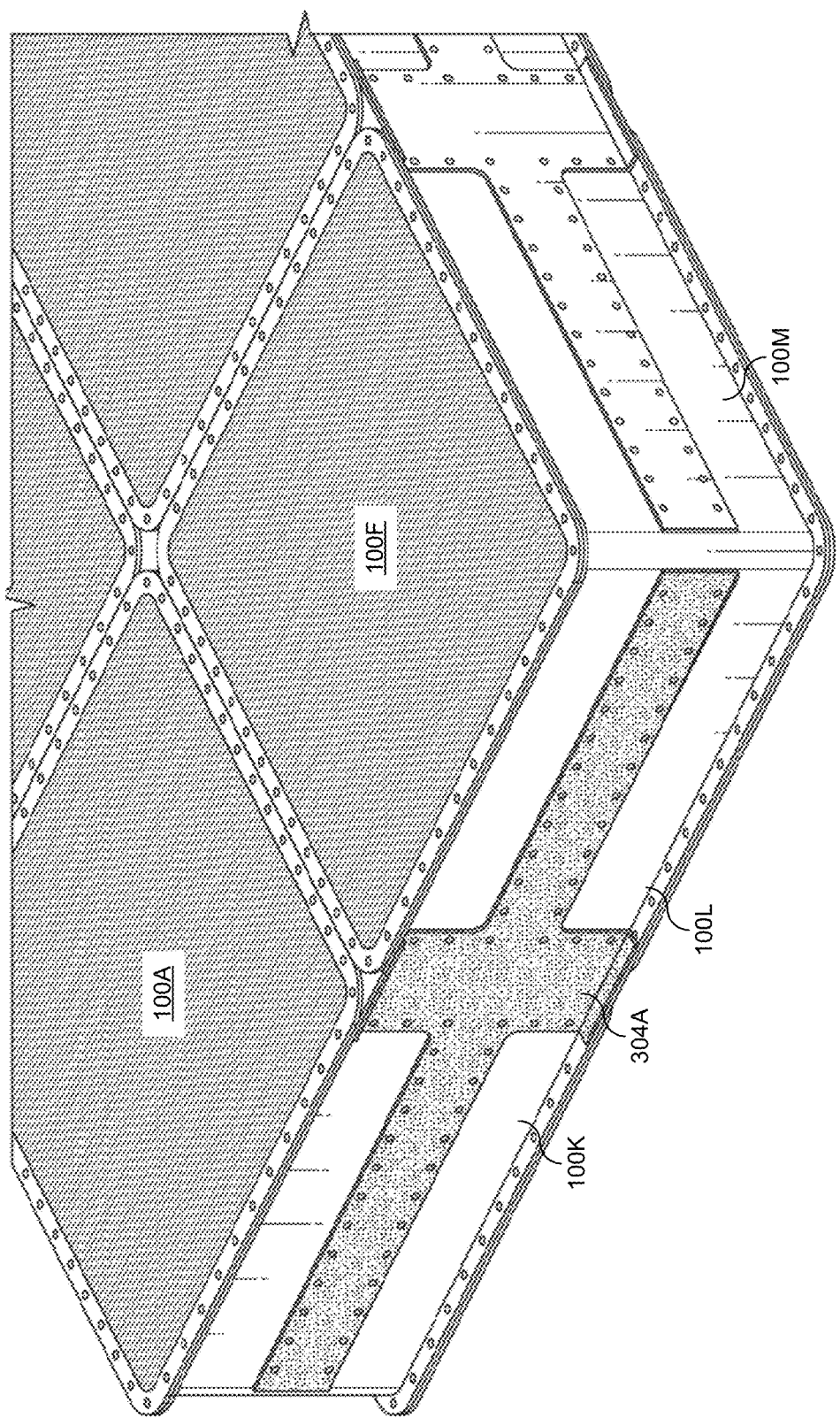
FIG. 4 is a view of one end of the lightweight structural vented battery system of FIG. 3 according to some embodiments of the disclosed technologies.

FIG. 4 is a view of one end of the lightweight structural vented battery system 300 of FIG. 3 according to some embodiments of the disclosed technologies. In FIG. 4, one end plate 304A is shaded for emphasis.

Figure 5:
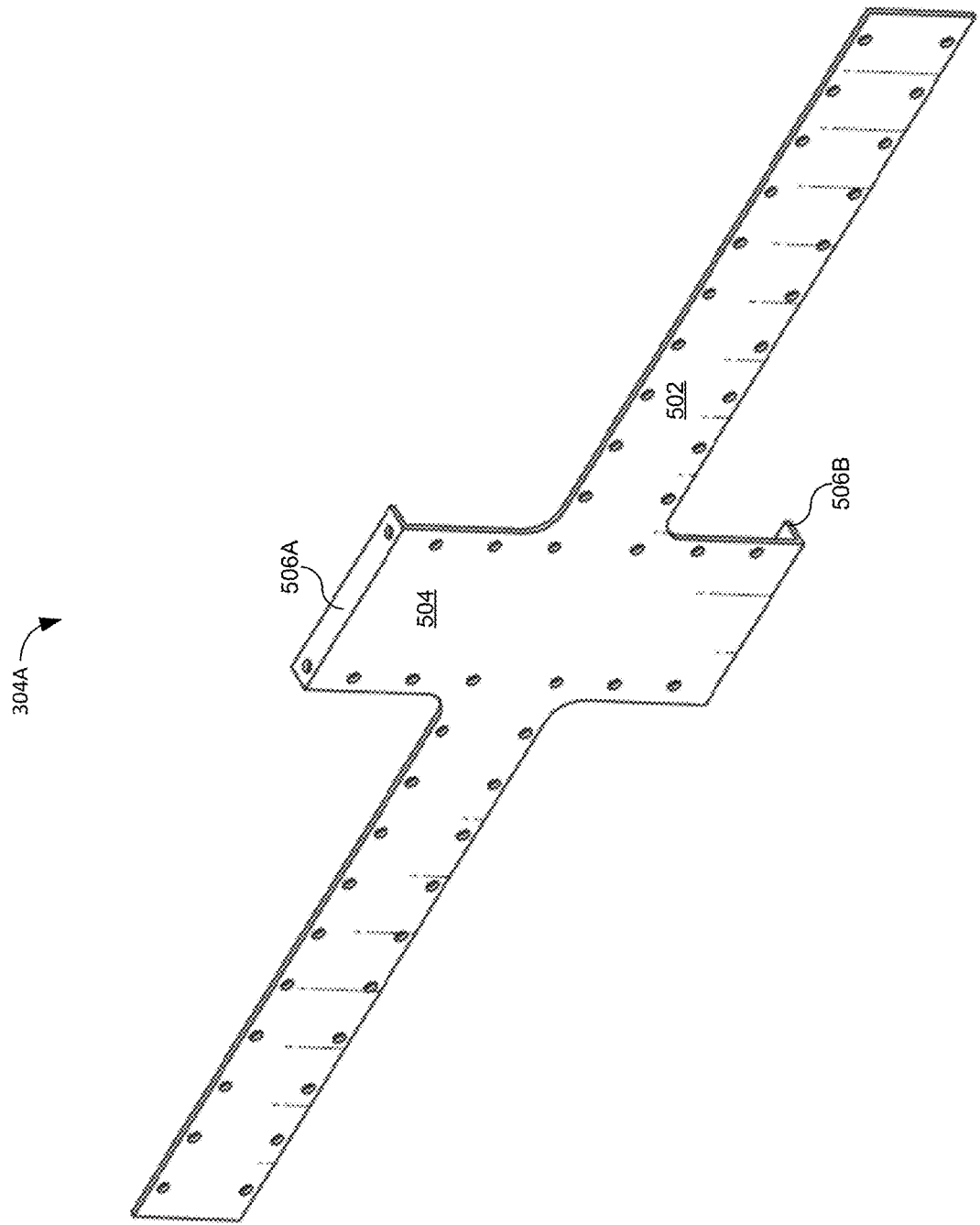
FIG. 5 illustrates the end plate according to some embodiments of the disclosed technologies.

FIG. 5 illustrates the end plate 304A according to some embodiments of the disclosed technologies. In the example of FIG. 5, the end plate 304A includes a horizontal arm 502 and a vertical arms 504. The vertical arm 504 may include flanges 506A,B. The horizontal arm 502, vertical arm 504, and flanges 506A,B may include holes formed therethrough for attachment to the battery modules 100 using fasteners. In other embodiments, other methods of attachment may be used.

Figure 6:
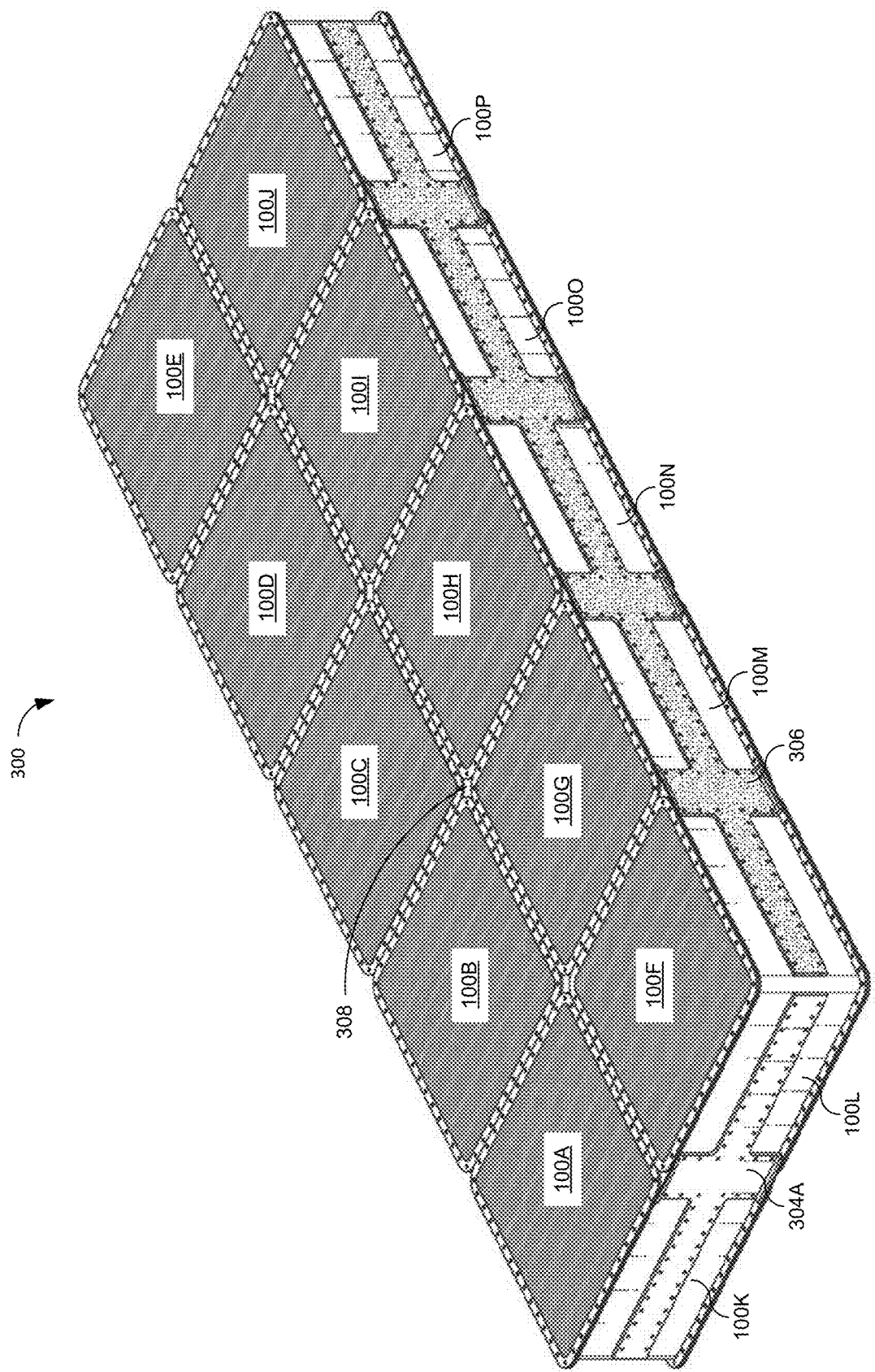
FIG. 6 illustrates the lightweight structural vented battery system of FIG. 3 with one side plate shaded for emphasis.

FIG. 6 illustrates the lightweight structural vented battery system 300 of FIG. 3 with one side plate 306 shaded for emphasis.

Figure 7:
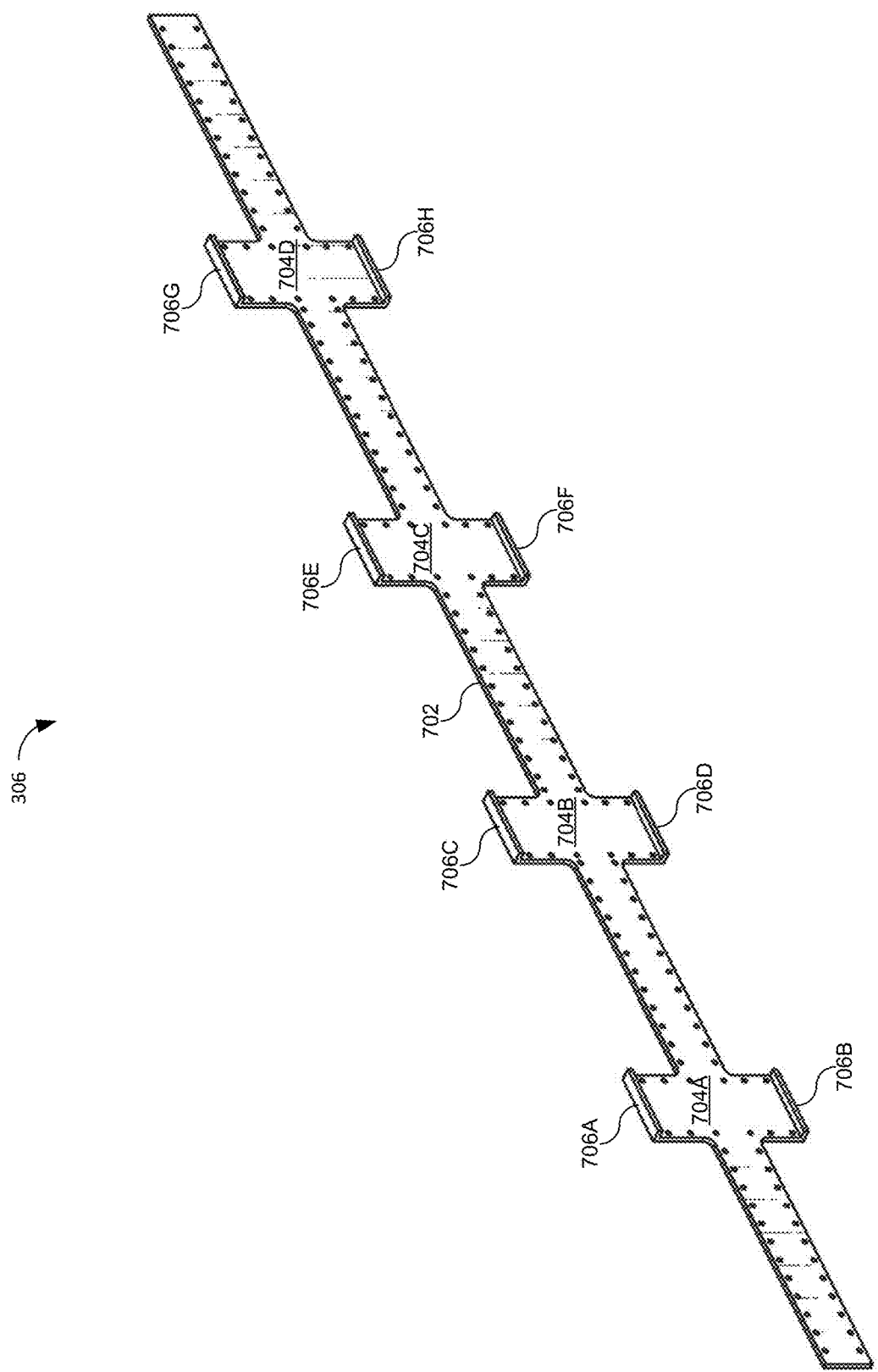
FIG. 7 illustrates the side plate according to some embodiments of the disclosed technologies.

FIG. 7 illustrates the side plate 306 according to some embodiments of the disclosed technologies. The other side plate may be the same as the side plate 306. In the example of FIG. 7, the side plate 306 includes a horizontal arm 702 and four vertical arms 704A,B,C,D. In embodiments having other quantities of battery modules, other quantities of vertical arms may be used. The vertical arms 704A,B,C,D may include flanges 706A,B,C,D,E,F,G,H. The horizontal arm 702, vertical arms 704A,B,C,D and flanges 706A,B,C,D,E,F,G,H may include holes formed therethrough for attachment to the battery modules 100 using fasteners. In other embodiments, other methods of attachment may be used.

Figure 8:
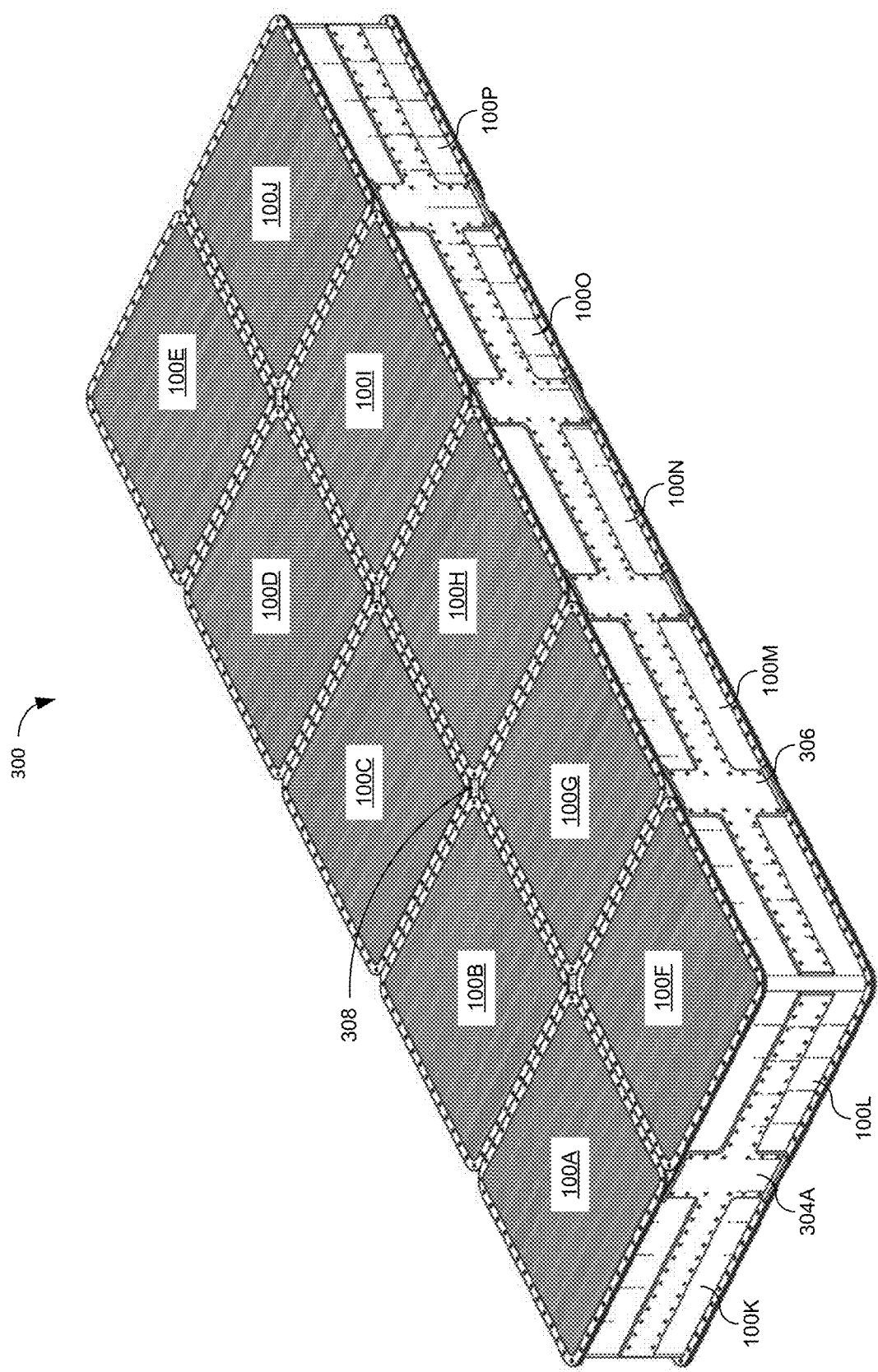
FIG. 8 illustrates the lightweight structural vented battery system of FIG. 3 with the top plate 308 shaded for emphasis.

FIG. 8 illustrates the lightweight structural vented battery system 300 of FIG. 3 with the top plate 308 shaded for emphasis.

Figure 9:
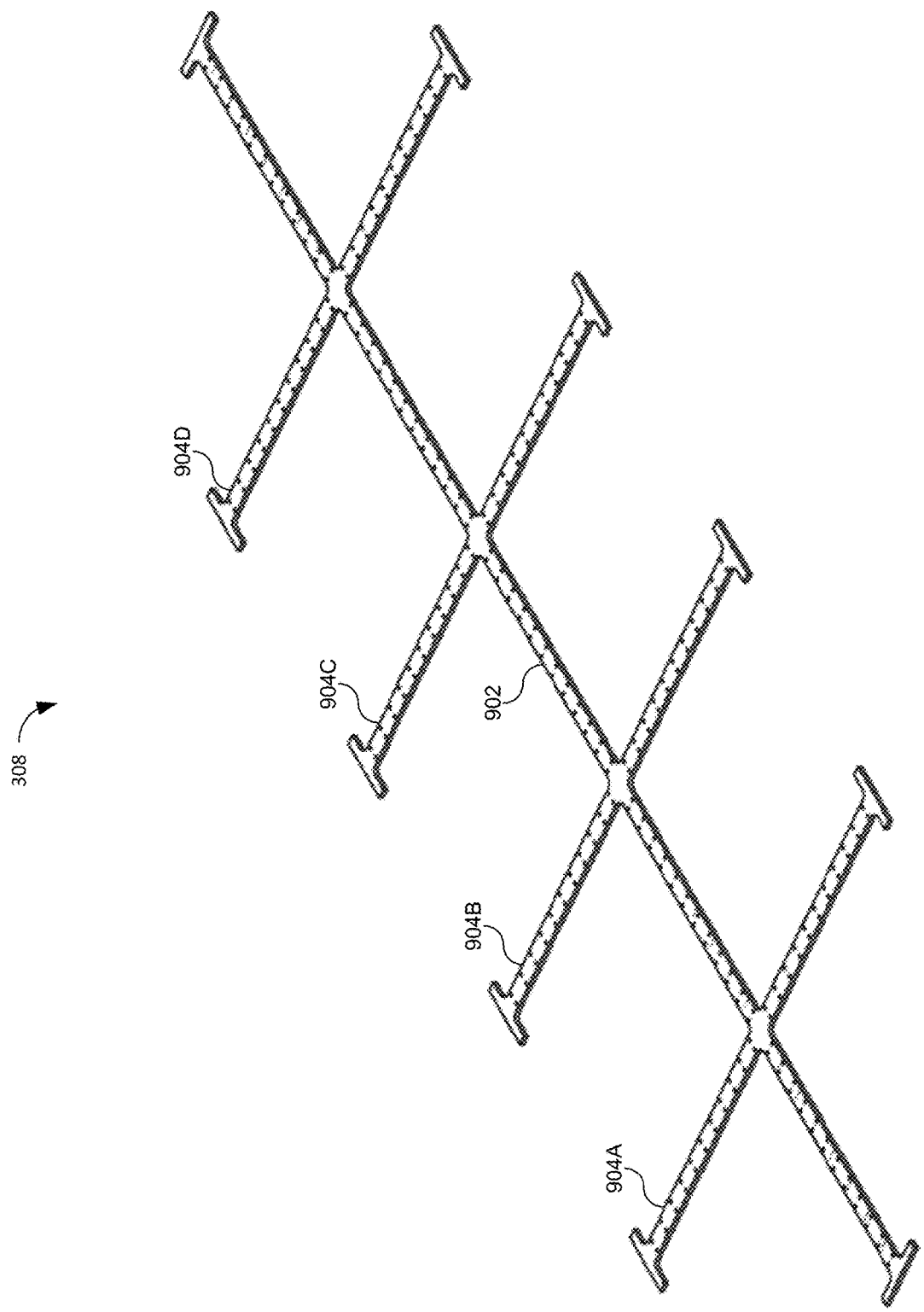
FIG. 9 illustrates the top plate according to some embodiments of the disclosed technologies.

FIG. 9 illustrates the top plate 308 according to some embodiments of the disclosed technologies. The bottom plate may be the same as the top plate 308. In the example of FIG. 9, the top plate 308 includes a longitudinal arm 902 and four transverse arms 904A,B,C,D. In embodiments having other quantities of battery modules, other quantities of transverse arms may be used. The longitudinal arm 902 and transverse arms 904A,B,C,D may include holes formed therethrough for attachment to the battery modules 100 using fasteners. In other embodiments, other methods of attachment may be used.

FIG. 10 illustrates a lightweight structural vented battery system 1000 with one end plate removed according to some embodiments of the disclosed technologies. Referring to FIG. 10, with the end plate removed, the exhaust chamber 1002 is visible. Also visible are holes 206 in two of the battery modules 100A and 100B, as well as the exhaust ports 210 of the battery cells 204 mounted in the holes 206.

Figure 11:
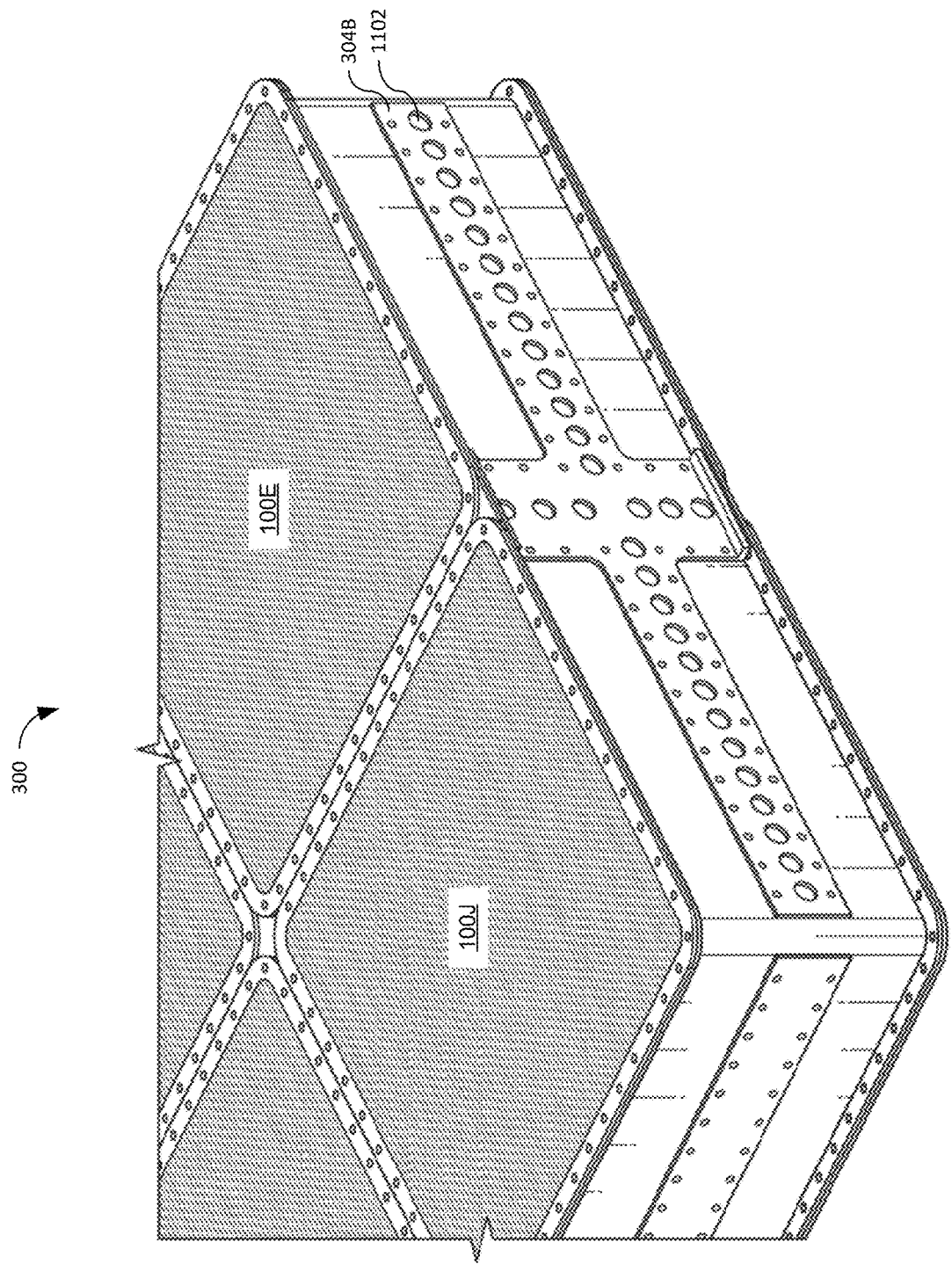
FIG. 11 illustrates the lightweight structural vented battery system of FIG. 3 with outlet ports according to some embodiments of the disclosed technologies.

FIG. 11 illustrates the lightweight structural vented battery system 300 of FIG. 3 with outlet ports according to some embodiments of the disclosed technologies. Referring to FIG. 11, multiple outlet ports 1102 are formed in one of the end plates 304B. The quantity and sizes of the outlet ports 1102 may be selected according to various factors. The factors may include the number of battery modules, the type of battery cells, and the like. In some embodiments, one or more outlet ports 1102 may be located in other structural members. The outlet port(s) may be in fluid communication with the exhaust chamber 1002 and an exterior of the exhaust chamber, thereby allowing any ejecta of the batteries to escape.

Figure 12:
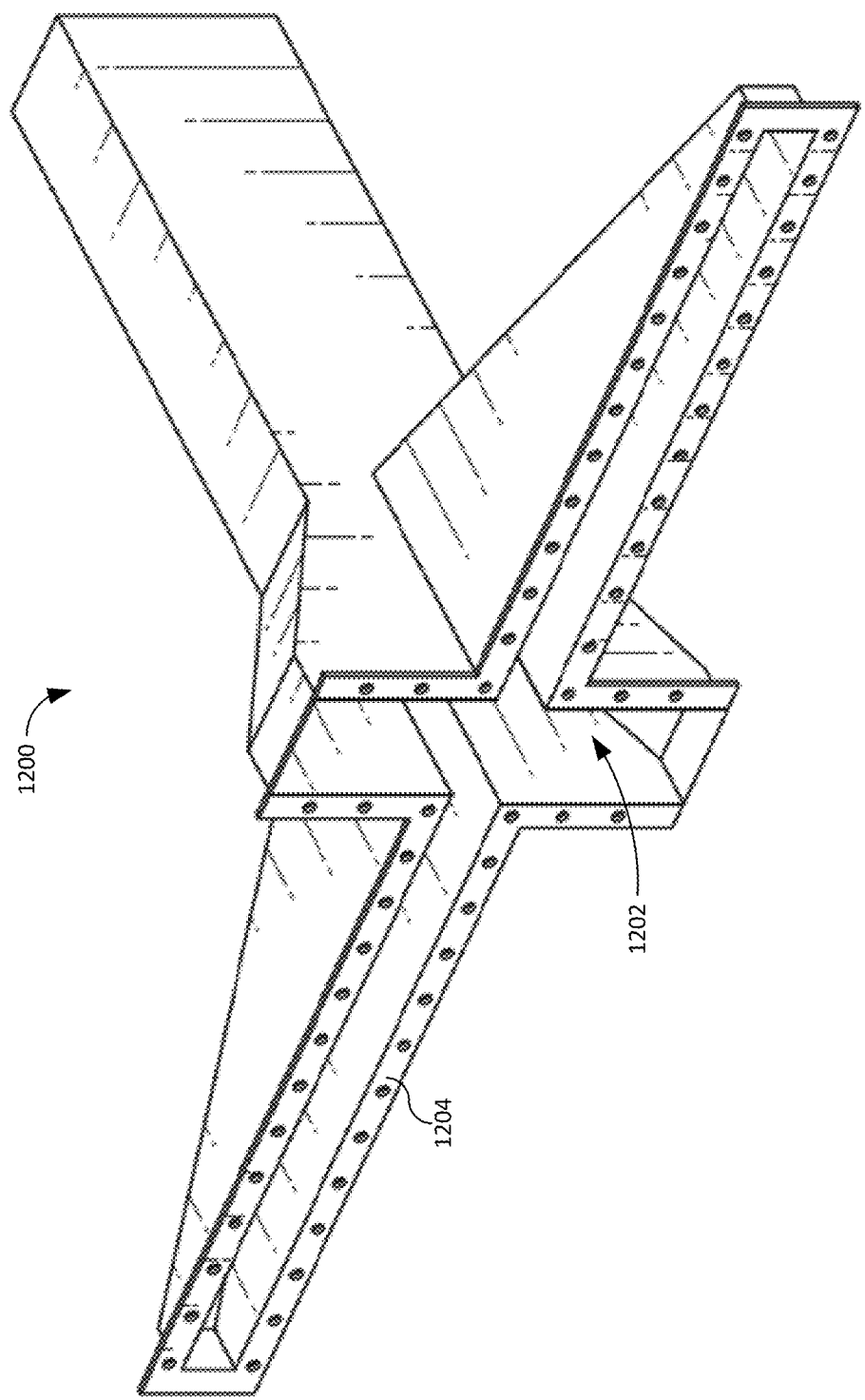
FIG. 12 illustrates an exhaust pipe for use with the lightweight structural vented battery system of FIG. 3 according to some embodiments of the disclosed technologies.

FIG. 12 illustrates an exhaust pipe 1200 for use with the lightweight structural vented battery system 300 of FIG. 3 according to some embodiments of the disclosed technologies. The exhaust pipe 1200 may include a duct for venting exhaust gases from the exhaust chamber of the battery system 300. The exhaust pipe 1200 may include one or more flanges 1204 that mate with the end plate 304 of the battery system 300. The flange(s) may have holes formed therethrough for attachment to the end plate 304 using fasteners. The fasteners may include rivets, screws, nuts and bolts, and similar fasteners. In other embodiments, other methods of attachment may be used. The exhaust pipe 1200 may be fabricated from any suitable material. The material may be metal. The metal may be stainless steel or aluminum.

Figure 13:
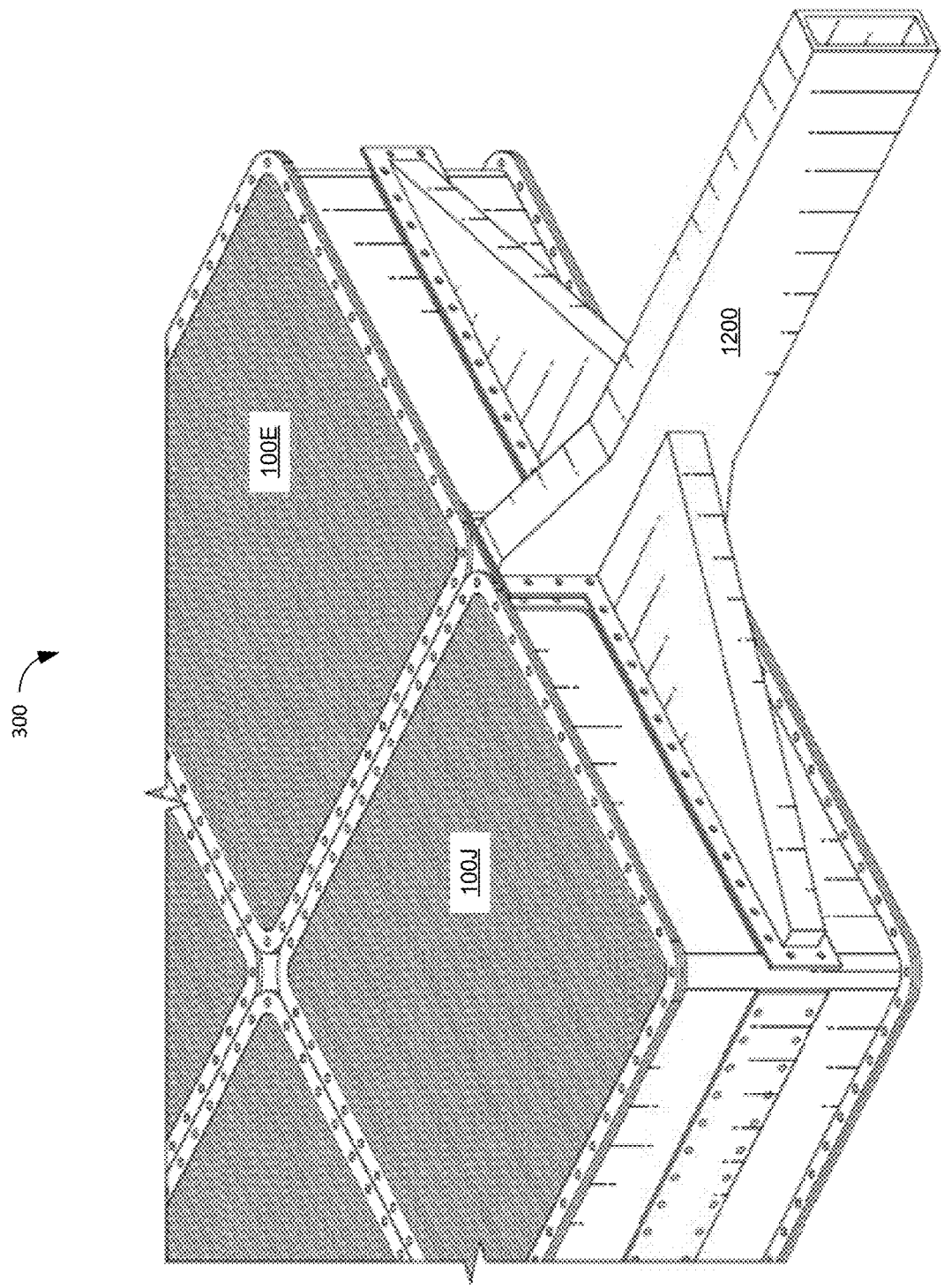
FIG. 13 illustrates the lightweight structural vented battery system of FIG. 3 with the exhaust pipe of FIG. 12 attached to the end plate of the battery system according to some embodiments of the disclosed technologies.

FIG. 13 illustrates the lightweight structural vented battery system 300 of FIG. 3 with the exhaust pipe 1200 of FIG. 12 attached to the end plate 304 of the battery system 300 according to some embodiments of the disclosed technologies.

Figure 14:
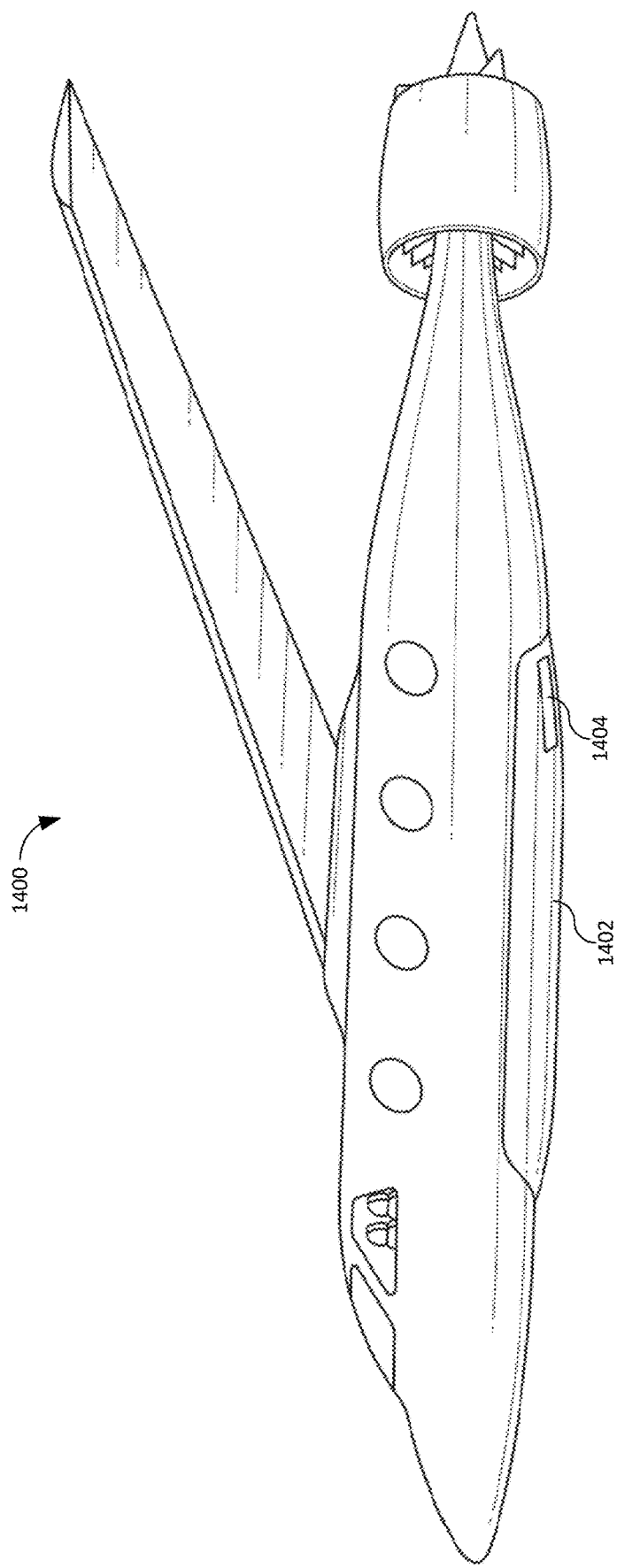
FIG. 14 illustrates an aircraft that includes the disclosed lightweight structural vented battery system according to some embodiments of the disclosed technologies.

FIG. 14 illustrates an aircraft 1400 that includes the disclosed lightweight structural vented battery system according to some embodiments of the disclosed technologies. The aircraft 1400 may include a fairing 1402 formed on or attached to the belly of the aircraft 1400. The battery system may be disposed within the fairing 1402. The battery system may be attached to the aircraft by a bracket mechanically coupled to the aircraft, one or more of the battery modules, and/or one or more of the structural members. The fairing may include an exhaust pipe 1100. The exhaust port 1404 may be in fluid communication with the exhaust port 1404 of the fairing.

Figure 15:
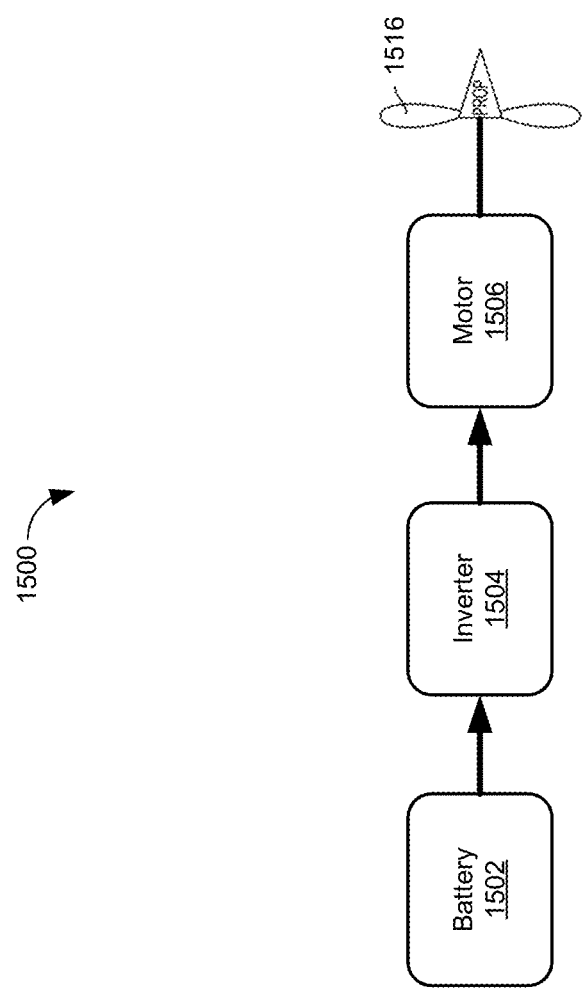
FIG. 15 illustrates an electric power train for an electric aircraft such as the electric aircraft of FIG. 14.

FIG. 15 illustrates an electric power train 1500 for an electric aircraft such as the electric aircraft 1400 of FIG. 14. A drive system for a hybrid aircraft may be similar, and may also include a combustion engine. The electric power train 1500 includes a battery system 1502, an inverter 1504, an electric motor 1506 powered by the battery system 1502, and a propeller 1516 driven by the electric motor 1506. In other types of vehicles, the propeller 1516 may be replaced with wheels, thrusters, or similar drive mechanisms. The battery system 1502 may be implemented according to the battery systems disclosed herein.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A battery system for a vehicle, the battery system comprising:
    multiple battery modules, wherein each battery module comprises one or more battery cells, and wherein each battery module comprises an exhaust port;
    one or more structural members mechanically coupled to the multiple battery modules;
    at least one upper row of the battery modules, wherein each of the battery modules has a top and a bottom, wherein the exhaust ports are formed in the bottoms of the battery modules, and wherein the tops of the battery modules in the at least one upper row face upward; and
    at least one lower row of the battery modules, wherein the at least one lower row of the battery modules is below the at least one upper row of the battery modules, and wherein the tops of the battery modules in the at least one lower row face downward;
    wherein the one or more structural members and the multiple battery modules define an exhaust chamber;
    wherein the exhaust chamber is in fluid communication with the exhaust ports of the multiple battery modules;
    wherein the one or more structural members comprise an outlet port in fluid communication with the exhaust chamber and an exterior of the exhaust chamber;
    wherein the one or more structural members comprise at least one first structural member mechanically coupled to at least one battery module in the at least one upper row and at least one battery module in the at least one lower row; and
    wherein the at least one first structural member, the at least one battery module in the at least one upper row, and the at least one battery module in the at least one lower row define at least a portion of the exhaust chamber.

2. The battery system of claim 1, further comprising: an exhaust pipe in fluid communication with the outlet port of the exhaust chamber.

3. The battery system of claim 2, further comprising: a fairing comprising an exhaust port;
    wherein the multiple battery modules and the one or more structural members are disposed within the fairing, and wherein the exhaust pipe is in fluid communication with the exhaust port of the fairing.

4. The battery system of claim 1, wherein at least one of the battery modules comprises:
    a heat sink.

5. The battery system of claim 1, wherein:
    the at least one upper row of the battery modules comprises at least two upper rows of the battery modules;
    the at least one lower row of the battery modules comprises at least two lower rows of the battery modules;
    the one or more structural members comprise at least one second structural member mechanically coupled to the tops of battery modules in at least two of the upper rows; and
    the at least one second structural member defines at least a portion of the exhaust chamber.

6. The battery system of claim 5, wherein:
    the one or more structural members comprise at least one third structural member mechanically coupled to the tops of battery modules in at least two of the lower rows; and
    the at least one third structural member defines at least a portion of the exhaust chamber.

7. An electric power train comprising:
    a battery system; and
    an electric motor powered by the battery system, wherein the battery system comprises:
        multiple battery modules, wherein each battery module comprises one or more battery cells, and wherein each battery module comprises an exhaust port;
        one or more structural members mechanically coupled to the multiple battery modules;
        at least one upper row of the battery modules, wherein each of the battery modules has a top and a bottom, wherein the exhaust ports are formed in the bottoms of the battery modules, and wherein the tops of the battery modules in the at least one upper row face upward; and
        at least one lower row of the battery modules, wherein the at least one lower row of the battery modules is below the at least one upper row of the battery modules, and wherein the tops of the battery modules in the at least one lower row face downward;
        wherein the one or more structural members and the multiple battery modules define an exhaust chamber;
        wherein the exhaust chamber is in fluid communication with the exhaust ports of the multiple battery modules;
        wherein the one or more structural members comprise an outlet port in fluid communication with the exhaust chamber and an exterior of the exhaust chamber;
        wherein the one or more structural members comprise at least one first structural member mechanically coupled to at least one battery module in the at least one upper row and at least one battery module in the at least one lower row; and
        wherein the at least one first structural member, the at least one battery module in the at least one upper row, and the at least one battery module in the at least one lower row define at least a portion of the exhaust chamber.

8. The electric power train of claim 7, wherein the battery system further comprises:
    an exhaust pipe in fluid communication with the outlet port of the exhaust chamber.

9. The electric power train of claim 8, wherein the battery system further comprises:
   a fairing comprising an exhaust port;
   wherein the multiple battery modules and the one or more structural members are disposed within the fairing, and wherein the exhaust pipe is in fluid communication with the exhaust port of the fairing.

10. The electric power train of claim 7, wherein at least one of the battery modules comprises:
    a heat sink.

11. The electric power train of claim 7, wherein:
    the at least one upper row of the battery modules comprises at least two upper rows of the battery modules;
    the at least one lower row of the battery modules comprises at least two lower rows of the battery modules;
    the one or more structural members comprise at least one second structural member mechanically coupled to the tops of battery modules in at least two of the upper rows; and
    the at least one second structural member defines at least a portion of the exhaust chamber.

12. The electric power train of claim 11, wherein:
    the one or more structural members comprise at least one third structural member mechanically coupled to the tops of battery modules in at least two of the lower rows; and
    the at least one third structural member defines at least a portion of the exhaust chamber.

* * * * *